United States Patent
Xiao et al.

(10) Patent No.: US 12,376,118 B2
(45) Date of Patent: Jul. 29, 2025

(54) METHOD PERFORMED BY USER EQUIPMENT, AND USER EQUIPMENT

(71) Applicant: SHARP KABUSHIKI KAISHA, Osaka (JP)

(72) Inventors: Fangying Xiao, Shanghai (CN); Renmao Liu, Shanghai (CN); Shohei Yamada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 416 days.

(21) Appl. No.: 17/790,703

(22) PCT Filed: Jan. 6, 2021

(86) PCT No.: PCT/CN2021/070435
§ 371 (c)(1),
(2) Date: Jul. 1, 2022

(87) PCT Pub. No.: WO2021/139673
PCT Pub. Date: Jul. 15, 2021

(65) Prior Publication Data
US 2023/0058734 A1 Feb. 23, 2023

(30) Foreign Application Priority Data
Jan. 7, 2020 (CN) .......................... 202010016738.2

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04W 72/1263* (2013.01); *H04W 72/569* (2023.01); *H04W 80/02* (2013.01)

(58) Field of Classification Search
None
See application file for complete search history.

(56) References Cited

U.S. PATENT DOCUMENTS

2020/0351936 A1* 11/2020 Kunt .......................... H04L 1/08
2021/0144751 A1* 5/2021 Joseph ................ H04W 72/115
(Continued)

OTHER PUBLICATIONS

Nokia et al., "New WID: Support of NR Industrial Internet of Things (IoT)", RP-190728 3GPP TSG RAN Meeting #83, Shenzhen, China, Mar. 18-21, 2019.
(Continued)

*Primary Examiner* — Clemence S Han
(74) *Attorney, Agent, or Firm* — ScienBiziP, P.C.

(57) ABSTRACT

The present disclosure provides a method performed by user equipment, and user equipment. The method performed by user equipment includes: if a medium access control (MAC) entity is configured with a configured uplink grant and if the configured uplink grant is activated, then determining whether the MAC entity is configured to use the configured uplink grant to transmit a MAC PDU, namely a MAC protocol data unit, obtained for a de-prioritized configured uplink grant; and if the MAC entity is configured to use the configured uplink grant to transmit the MAC PDU, then delivering the configured uplink grant to a hybrid automatic repeat request (HARQ) entity. In this way, the problem involving transmission of a de-prioritized MAC PDU stored in a HARQ process buffer can be solved, thereby improving the communication efficiency and reliability of a wireless communication system.

2 Claims, 4 Drawing Sheets

(51) Int. Cl.
  *H04W 72/1263* (2023.01)
  *H04W 72/566* (2023.01)
  *H04W 80/02* (2009.01)

(56) References Cited

U.S. PATENT DOCUMENTS

| | | | |
|---|---|---|---|
| 2022/0109486 A1* | 4/2022 | Fu | H04L 5/0023 |
| 2022/0159708 A1* | 5/2022 | Alabbasi | H04W 72/23 |
| 2022/0183050 A1* | 6/2022 | Marco | H04L 1/1822 |
| 2022/0294576 A1* | 9/2022 | Kuo | H04L 1/1822 |

OTHER PUBLICATIONS

3GPP TS 38.331 V15.5.0 (Mar. 2019) 9rd Generation Partnership Project; Technical Specification Group Radio Access Network; NR; Radio Resource Control (RRC) protocol specification (Release 15).
3GPP TS 38.321 V15.5.0 (Mar. 2019) 3rd Generation Partnership Project; Technical Specification Group Radio Access Network; NR; Medium Access Control (MAC) protocol specification (Release 15).

* cited by examiner

METHOD PERFORMED BY USER EQUIPMENT, AND USER EQUIPMENT

TECHNICAL FIELD

The present disclosure relates to the technical field of wireless communications. More specifically, the present disclosure relates to a method performed by user equipment, and user equipment.

BACKGROUND

In March 2019, a work item on support of the NR Industrial Internet of Things (see Non-Patent Document: RP-190728: New WID: Support of NR Industrial Internet of Things (IoT)) was approved at the 3rd Generation Partnership Project (3GPP) RAN #83 plenary meeting. In an industrial application scenario, user equipment (UE) needs to simultaneously process traffic flows from different applications or devices. Therefore, it is necessary to consider priority processing and/or multiplexing for an intra-UE and/or inter-UE conflict between an uplink/downlink data channel and a control channel, and consider processing for resource conflicts between a dynamic grant (DG) and a configured grant (CG) and between two or more configured grants (namely a conflict between a data channel and a data channel or a conflict between uplink shared channels (UL-SCHs)). Accordingly, one of the objectives of this work item is to enhance resolution of resource conflicts between the dynamic grant and the configured grant and between two or more configured grants. If a grant priority is processed in medium access control (MAC), then 3GPP Working Group 2 (RAN2) needs to define a physical uplink shared channel (PUSCH) grant priority processing mechanism based on a logical channel (LCH) priority and logical channel priority (LCP) restrictions.

The present disclosure solves the problem involving transmission of a de-prioritized MAC PDU stored in a HARQ process buffer.

SUMMARY

In order to solve the above problem in the prior art, the present disclosure provides a method performed by user equipment and user equipment capable of solving the problem involving transmission of a de-prioritized MAC PDU stored in a HARQ process buffer, thereby improving the communication efficiency and reliability of a wireless communication system.

According to a first aspect of the present disclosure, a method performed by user equipment is provided, and comprises: for a MAC entity configured with lch-basedPrioritization and for a first configured uplink grant, if a PUSCH duration of the first configured uplink grant does not overlap with a PUSCH duration of a second configured uplink grant having a priority higher than a priority of the first configured uplink grant, if the PUSCH duration of the first configured uplink grant does not overlap with a PUSCH duration of an uplink grant addressed to a C-RNTI or a CS-RNTI having a priority higher than or equal to the priority of the first configured uplink grant, and if the PUSCH duration of the first configured uplink grant does not overlap with a PUCCH resource of a scheduling request (SR) transmission, wherein a priority of a logical channel triggering the SR being higher than the priority of the first configured uplink grant, then considering the first configured uplink grant as a prioritized configured uplink grant, and considering another uplink grant overlapping with the first configured uplink grant as a de-prioritized uplink grant; and if the UE is configured with autonomousReTx and if the de-prioritized uplink grant is a configured uplink grant, then stopping configuredGrantTimer corresponding to a HARQ process of the de-prioritized uplink grant, wherein lch-basedPrioritization is used to indicate that the MAC entity is configured to determine prioritization between overlapping uplink grants and between an uplink grant overlapping with a scheduling request (SR) on the basis of priorities of logical channels, and autonomousReTx is used to indicate that a prioritized configured uplink grant can be used to transmit a MAC PDU obtained for a HARQ corresponding to the prioritized configured uplink grant, transmission of the MAC PDU has not been completed, a previous configured uplink grant associated with said HARQ process is a de-prioritized configured uplink grant, and configuredGrantTimer is a timer configured for each configured uplink grant.

According to a second aspect of the present disclosure, user equipment is provided, and comprises: a processor; and a memory storing instructions, wherein when run by the processor, the instructions perform the above method.

Effect of Invention

The method performed by user equipment and user equipment according to the present disclosure can solve the problem involving transmission of a de-prioritized MAC PDU stored in a HARQ process buffer, thereby improving the communication efficiency and reliability of a wireless communication system.

BRIEF DESCRIPTION OF DRAWINGS

The above and other features of the present disclosure will become more apparent with the following detailed description in conjunction with the accompanying drawings.

DETAILED DESCRIPTION

Figure 1:
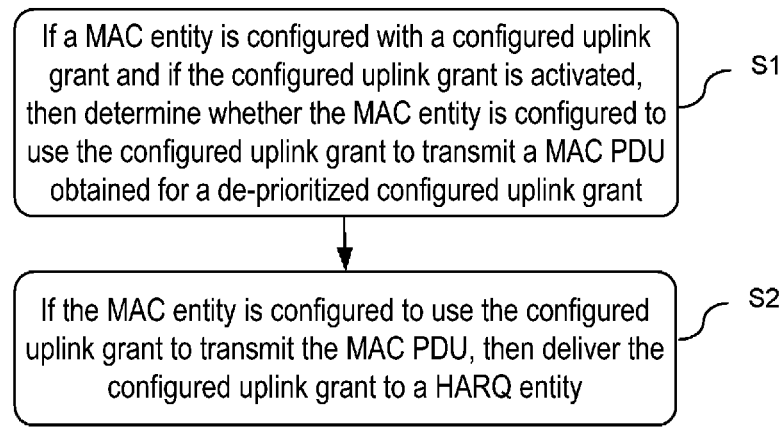
FIG. 1 shows a flowchart of a method performed by user equipment according to an embodiment of the present disclosure.

The present disclosure is described in detail below with reference to the accompanying drawings and specific embodiments. It should be noted that the present disclosure should not be limited to the specific embodiments described below. In addition, for simplicity, detailed description of the known art not directly related to the present disclosure is omitted to avoid obscuring the understanding of the present disclosure.

The following describes some terms involved in the present disclosure. Unless otherwise specified, the terms are the same as those used in the current latest versions of 3GPP protocols, and are excerpted herein as follows.

RRC: Radio Resource Control
MAC: Medium Access Control
PDCCH: Physical Downlink Control Channel
PUCCH: Physical Uplink Control Channel
PUSCH: Physical Uplink Shared Channel
UL-SCH: Uplink Shared Channel SDU: Service Data Unit PDU: Protocol Data Unit SR: Scheduling Request CG: Configured Uplink Grant UL Grant: Uplink Grant configuredGrantTimer: this is a timer, wherein an initial value of the timer is configured by a base station for each CG of UE by means of RRC signaling, and a value thereof is multiple times a corresponding CG period. For configurations of this timer, please refer to an information element configuredGrantTimer defined in TS 38.331, and starting and stopping operations on this timer are described in TS 38.321. In embodiments of the present disclosure, other starting or stopping conditions for this timer are added.

RNTI: Radio Network Temporary Identifier

CS-RNTI: Configured Scheduling RNTI

DG: Dynamic Grant, referring to an uplink grant dynamically received on a PDCCH; in other words, an uplink grant addressed to a C-RNTI or a TC-RNTI (Temporary C-RNTI) of a MAC entity received on the PDCCH, or an uplink grant addressed to a CS-RNTI of a MAC entity received on the PDCCH. The uplink grant addressed to the CS-RNTI of the MAC entity may be for re-transmission of a MAC PDU transmitted on the configured uplink grant. In this case, a value of a received new data indicator (NDI) being 1 indicates that the NDI is not toggled. The uplink grant addressed to the C-RNTI or the TC-RNTI or the CS-RNTI of the MAC entity received on the PDCCH is an uplink grant indicated by the PDCCH scrambled by the C-RNTI or the TC-RNTI or the CS-RNTI of the MAC entity. These two expressions can be used interchangeably.

HARQ information: the HARQ information transmitted by a DL-SCH or a UL-SCH consists of an NDI, a transport block size (TBS), a redundancy version (RV), and a HARQ process identifier (HARQ process ID). The HARQ information may further include other information.

ra-ResponseWindow: the time window to monitor random access (RA) response(s).

lch-basedPrioritization: used to indicate that the MAC entity determines a priority of an uplink grant and/or a scheduling request (SR) according to priorities of logical channels. That is, for the MAC entity configured with lch-basedPrioritization, a priority of an uplink grant is determined by the highest priority among priorities of the logical channels with data that can be multiplexed or is multiplexed according to a logical channel priority (LCP) procedure defined in TS 38.321. The priority of the SR is determined by a priority of a logical channel triggering the SR. In other words, the priority of the uplink grant is the highest priority of a logical channel meeting a condition, and the priority of the SR is the priority of the logical channel triggering the SR. The MAC entity being configured with lch-basedPrioritization means that a received RRC message includes this parameter and/or a value of this parameter is configured to be TRUE or Support or 1. Operations performed by the MAC entity configured with this parameter are described in detail in the embodiments of the present disclosure.

autonomousReTx: used to indicate whether to support transmission of a de-prioritized MAC PDU performed by means of the same HARQ process of the configured uplink grant (for example, the same configured uplink grant), or used to indicate that the MAC entity transmits the de-prioritized MAC PDU by means of the same HARQ process of the configured uplink grant (for example, the same configured uplink grant). The MAC entity being configured with autonomousReTx means that the MAC entity is configured to use the configured uplink grant to transmit a MAC PDU obtained for a de-prioritized configured uplink grant, and/or a received RRC message includes this parameter and/or a value of this parameter is configured to be TRUE or Support or 1. Operations performed by the MAC entity configured with this parameter are described in detail in the embodiments of the present disclosure.

Information elements ra-ResponseWindow, lch-basedPrioritization, and autonomousReTx are all configured by the base station for the user equipment by means of RRC signaling or a system information message. lch-basedPrioritization and autonomousReTx may be separately configured by the base station for each MAC entity of the UE.

In the present disclosure, a MAC PDU obtained for a de-prioritized configured uplink grant is referred to as a de-prioritized MAC PDU. Optionally, a MAC PDU (or a MAC PDU corresponding to a transport block) discarded due to a physical layer transmitting a prioritized channel status indicator (CSI) or HARQ ACK/NACK (positive acknowledgement/negative acknowledgement) or due to an uplink cancellation indication being received is also referred to as a de-prioritized MAC PDU. The uplink cancellation indication indicates that the physical layer does not transmit the PUSCH or interrupts a current PUSCH transmission.

The 3GPP RAN2 #105bis meeting held in April 2019 reached the following conclusion: when a plurality of configured grants (CGs) or downlink semi-persistent schedulings (SPSs) are configured, each CG or SPS is configured with one offset for calculating a hybrid automatic repeat request (HARQ) process ID. The purpose of this conclusion is to map different configured uplink grants (or downlink SPSs) to different HARQ processes, so that HARQ processes associated with or mapped to or used by the configured uplink grants (or downlink SPSs) are different or have no overlap. The 3GPP RAN2 #106 meeting held in May 2019 reached the following conclusion: for a de-prioritized PUSCH on a dynamic grant, the UE should store, in the HARQ buffer, the de-prioritized MAC PDU corresponding thereto, to allow a gNB to schedule re-transmission by using the same HARQ process. For a de-prioritized PUSCH on configured uplink grants, a) the UE could store, in the HARQ buffer, the de-prioritized MAC PDU corresponding thereto, to allow a gNB to schedule re-transmission; b) whether the UE can perform re-transmission by using subsequent radio resources, for example, by using subsequent radio resources associated with the same HARQ process, needs further discussion. The above conclusion is applicable to at least a case in which the MAC entity has generated a MAC PDU for the de-prioritized dynamic grant or configured uplink grant. The RAN2 #107 meeting reached the following conclusion: a priority scheme the same as that for a conflict between a CG and a DG is used for a conflict between a CG and another CG (that is, both are based on the same priority determination method). The same priority scheme is used for a resource conflict between a new transmission (namely generation of a new MAC PDU for the uplink grant) and another new transmission and a resource conflict between a new transmission and a re-transmission (namely re-transmission of the MAC PDU). A recovery mechanism for the de-prioritized MAC PDU in an event of a conflict between PUSCHs (namely a method for re-transmitting, when a conflict occurs, the de-prioritized MAC PDU stored in the HARQ process buffer) is also applied to a conflict between the PUSCH and the scheduling request (SR). When a conflict occurs between the DG and the CG, if these two grants have the same priority (that is, MAC PDUs generated for these two uplink grants have the same priority or the same highest priority), then it is considered that the MAC PDU generated for the DG is prioritized (that is, a MAC layer instructs the physical layer to transmit the MAC PDU generated for the DG). When a conflict occurs between two uplink grants, if no MAC PDU has been generated for these two uplink grants, then a MAC PDU is generated for only one of the uplink grants. If a PUCCH used to transmit the SR overlaps with the UL-SCH, then it is determined, by comparing the priority of the logical channel triggering the SR with a priority of the UL-SCH, whether to transmit the SR. If the logical channel triggering the SR is prioritized, then the SR is transmitted. If the SR is before the MAC PDU generated for the UL-SCH, if a conflict occurs between the PUCCH used to transmit the SR and the UL-SCH of the MAC PDU (that is, the two cannot be transmitted simultaneously), and if the UL-SCH is de-prioritized, then no MAC PDU is generated for the UL-SCH. The RAN2 #108 meeting reached the following agreement: the UE transmits the de-prioritized MAC PDU by means of new transmission on the same HARQ process of the same CG. Whether to use the CG to transmit the de-prioritized MAC PDU is configured by a network (namely the base station). In addition, if the network schedules re-transmission of the de-prioritized MAC PDU, then this MAC PDU can no longer be transmitted on the CG.

In the present disclosure, in a serving cell, PUSCH duration of an uplink grant (namely a dynamic grant (DG) or a configured uplink grant or a UL-SCH) on a certain HARQ process conflicting or overlapping with the scheduling request (SR) (namely a PUCCH of the SR or PUCCH duration of the SR or a PUCCH on which the SR occurs or PUCCH duration of SR transmission) is referred to as an uplink grant/SR conflict (in other words, the UL-SCH or the PUSCH and the SR cannot both be transmitted or cannot be transmitted simultaneously). In a serving cell, PUSCH duration of a dynamic grant (DG) on a certain HARQ process overlapping with PUSCH duration of a configured grant (CG) on another HARQ process is referred to as a DG/CG PUSCH conflict. In a serving cell, PUSCH duration of a configured grant (CG) on a certain HARQ process overlapping with PUSCH duration of a configured grant (CG) on another HARQ process is referred to as a CG/CG PUSCH conflict. The DG/CG PUSCH conflict includes a case in which one DG conflicts with PUSCH duration between a plurality of CGs on different HARQ processes. Similarly, the CG/CG PUSCH conflict further includes a case in which PUSCH duration between a plurality of CGs conflict with each other, and the uplink grant/SR conflict further includes a case in which a plurality of uplink grants conflict with the SR. Unless otherwise specified, the DG/CG or CG/CG conflict described in the embodiments of the present disclosure includes the various conflicts described above, and the conflict means that a conflicting DG and CG and two or more conflicting CGs or SRs are all in the same serving cell. In the present disclosure, PUSCH overlapping (or conflict) or PUSCH-SR overlapping (or conflict) occurring on different uplink grants may be that different uplink grants overlap with each other in the time domain. In other words, these uplink grants cannot all be transmitted, or cannot be transmitted simultaneously.

If a MAC PDU is generated for a CG in which a DG/CG or CG/CG conflict or an uplink grant/SR conflict occurs, and if the MAC PDU is stored in a HARQ buffer of a corresponding HARQ process (namely a HARQ process corresponding to the CG or a HARQ process identified by the CG) and is not transmitted (for example, due to the MAC PDU being de-prioritized), then the reason for not being transmitted may be because the MAC PDU is not indicated to the physical layer, or the MAC PDU has been indicated to the physical layer but no transmission is performed due to conflict with a prioritized MAC PDU or SR, or an uplink cancellation indication is received, or transmission is interrupted, or transmission is not performed on a corresponding uplink grant, or the MAC PDU has been indicated to the physical layer but conflicting with a PUCCH for transmitting prioritized channel status information (CSI) or HARQ ACK or HARQ NACK. Optionally, when the physical layer discards a transport block (TB) or stops a pending PUSCH transmission or interrupts a current PUSCH transmission due to the PUCCH for transmitting prioritized channel status information (CSI) or HARQ ACK or HARQ NACK or due to an uplink cancellation indication being received, a transport block discarding indication or a transport block discarding indication of a corresponding HARQ process is transmitted to a higher layer. The transmitting of a transport block discarding indication or a transport block discarding indication of a corresponding HARQ process to a higher layer refers to transmitting a MAC PDU discarding indication or a MAC PDU discarding indication of the corresponding HARQ process to the higher layer.

FIG. 1 shows a flowchart of a method performed by user equipment according to an embodiment of the present disclosure.

As shown in FIG. 1, the method performed by user equipment according to the present disclosure includes step S1 and step S2.

In step S1, if a MAC entity is configured with a configured uplink grant and if the configured uplink grant is activated, then it is determined whether the MAC entity is configured to use the configured uplink grant to transmit a MAC PDU obtained for a de-prioritized configured uplink grant.

In step S2, if the MAC entity is configured to use the configured uplink grant to transmit the MAC PDU, then the configured uplink grant is delivered to a HARQ entity.

The above method can solve the problem involving transmission of a de-prioritized MAC PDU stored in a HARQ process buffer, thereby improving the communication efficiency and reliability of a wireless communication system.

Embodiment 1: for each serving cell and each configured uplink grant that is configured and activated (that is, a MAC entity is configured with an uplink grant and the uplink grant is activated), if the MAC entity is configured to use the configured uplink grant to transmit a MAC PDU obtained for a de-prioritized configured uplink grant, then the configured uplink grant is delivered to a HARQ entity (even if configuredGrantTimer of a corresponding HARQ process is running).

Figure 2:
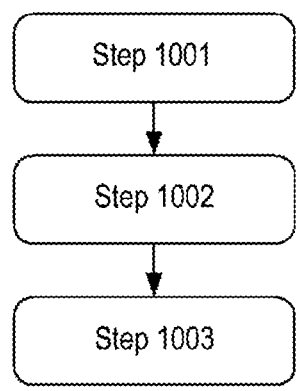
FIG. 2 shows a schematic flowchart of a method according to Embodiment 1 of the present disclosure.

The specific description is as follows:

FIG. 2 shows a schematic flowchart of the method according to Embodiment 1.

For each serving cell and each configured uplink grant that is configured and activated (that is, a MAC entity is configured with an uplink grant and the uplink grant is activated), the MAC entity performs the following operations:

In step 1001, if condition 1a or condition 1b is met, then step 1002 is performed:

Condition 1a: the MAC entity is configured with lch-basedPrioritization.

Condition 1b: the PUSCH duration of the configured uplink grant does not overlap with the PUSCH duration of an uplink grant received on the PDCCH or in a Random Access Response for this serving cell.

In step 1002, the HARQ Process ID is set to be the HARQ Process ID associated with this PUSCH duration, and if one of the following conditions 1c-1f is met, then step 1003 is performed:

Condition 1c: a timer configuredGrantTimer of a corresponding HARQ process is not running;

Condition 1d: the MAC entity is configured with autonomousReTx.

Condition 1e: the MAC entity is configured with lch-basedPeioritization.

Condition 1f: the MAC entity is configured with autonomousReTx, this configured uplink grant is a prioritized configured uplink grant (this condition is optional), a previous configured uplink grant of a corresponding HARQ process is a de-prioritized configured uplink grant, a MAC PDU has been obtained for the corresponding HARQ process, and this obtained MAC PDU has not been transmitted or an indication indicating discarding of this MAC PDU is received (this condition is optional).

In step 1003, at least one of the following operations 1A-1C is performed: Operation 1A, consider the new data indication (NDI) bit for the corresponding HARQ process to have been toggled.

Operation 1B, deliver the configured uplink grant and the associated HARQ information to the HARQ entity.

Operation 1C, consider that a MAC PDU has been obtained for this configured uplink grant (this operation is optional, and is applicable only when condition 1f is met).

It should be noted that not all of the conditions 1a-1f are necessarily used, and one or more of the conditions may be selected to form different embodiments.

Embodiment 2: when a configured uplink grant is a de-prioritized configured uplink grant, and if a MAC PDU has been obtained for this de-prioritized configured uplink grant, then a timer configuredGrantTimer is stopped (if the configured grant is configured with the timer configuredGrantTimer and if the timer configuredGrantTimer is running).

The specific description is as follows:

When a MAC entity is configured with lch-basedPrioritization, for an uplink grant addressed to a C-RNTI or a CS-RNTI: if PUSCH duration of this uplink grant does not overlap with PUSCH duration of a configured uplink grant having a priority higher than a priority of this uplink grant, and if the PUSCH duration of this uplink grant does not overlap with a PUCCH resource of a scheduling request (SR) transmission, where a priority of a logical channel triggering the SR is higher than the priority of this uplink grant, then at least one of the following operations 2A-2E is performed:

Operation 2A, consider this uplink grant as a prioritized uplink grant.

Operation 2B, if this uplink grant is a prioritized uplink grant addressed to the CS-RNTI, then consider that a MAC PDU obtained for this uplink grant has been transmitted or consider that a MAC PDU stored in a HARQ buffer of a HARQ process identified by this uplink grant has been transmitted (this operation is performed only when such MAC PDU exists).

Operation 2C, consider that the other overlapping uplink grant(s) is a de-prioritized uplink grant, and in other words, consider that the other overlapping uplink grant(s) having PUSCH duration overlapping with the PUSCH duration of this uplink grant (if any) is a de-prioritized uplink grant.

Operation 2D, if the de-prioritized uplink grant is the uplink grant addressed to the C-RNTI, if a HARQ process identified by this uplink grant is a HARQ process configured for a configured uplink grant, and if no MAC PDU has been obtained for the de-prioritized uplink grant, then stop a timer configuredGrantTimer of a corresponding HARQ process.

Operation 2E, if the de-prioritized uplink grant is a configured uplink grant, and if the MAC entity is configured with autonomouResTx, then stop a timer configuredGrantTimer (if the timer configuredGrantTimer is configured and is running) of a HARQ process (namely a HARQ process identified by this uplink grant) corresponding to this de-prioritized uplink grant, and/or consider that a MAC PDU obtained for this uplink grant is not transmitted or consider that a MAC PDU corresponding to this uplink grant is not transmitted.

When the MAC entity is configured with lch-basedPrioritization, then for each configured uplink grant:

if PUSCH duration of this uplink grant does not overlap with PUSCH duration of another configured uplink grant having a priority higher than a priority of this uplink grant, if the PUSCH duration of this uplink grant does not overlap with PUSCH duration of an uplink grant addressed to a C-RNTI or a CS-RNTI having a priority higher than or equal to the priority of this uplink grant, and if the PUSCH duration of this uplink grant does not overlap with a PUCCH resource of a scheduling request (SR) transmission, where a priority of a logical channel triggering the SR is higher than the priority of this uplink grant, then at least one of the following operations 2F-2I is performed:

Operation 2F, consider this uplink grant as a prioritized uplink grant.

Operation 2G, if this uplink grant is a prioritized uplink grant, then consider that a MAC PDU obtained for this uplink grant has been transmitted or consider that a MAC PDU corresponding to this uplink grant has been transmitted (this operation is performed only when such MAC PDU exists).

Operation 2H, consider that the other overlapping uplink grant(s) is a de-prioritized uplink grant, and in other words, consider that the other overlapping uplink grant(s) having PUSCH duration overlapping with the PUSCH duration of this uplink grant (if any) is a de-prioritized uplink grant.

Operation 2I, if the de-prioritized uplink grant is a configured uplink grant, if the MAC entity is configured with autonomousReTx, and optionally, if a MAC PDU is obtained for this de-prioritized uplink grant, then stop a timer configuredGrantTimer (if the timer configuredGrantTimer is configured and is running) of a HARQ process (namely a HARQ process identified by this uplink grant) corresponding to this de-prioritized uplink grant, and/or consider that the MAC PDU obtained for this de-prioritized uplink grant is not transmitted or consider that a MAC PDU corresponding to this de-prioritized uplink grant is not transmitted.

When the MAC entity receives a transport block (or MAC PDU) discarding indication (from the physical layer) for a certain HARQ process, at least one of the following operations 2J-2K is performed:

Operation 2J, consider this uplink grant as a de-prioritized uplink grant.

Operation 2K, if the MAC entity is configured with autonomousReTx, and optionally, if a MAC PDU is obtained for this de-prioritized uplink grant, then stop a timer configuredGrantTimer (if the timer configuredGrantTimer is configured and is running) of a HARQ process (namely a HARQ process identified by this uplink grant) corresponding to this de-prioritized uplink grant, and/or consider that the MAC PDU obtained for this de-prioritized uplink grant is not transmitted or consider that a MAC PDU corresponding to this de-prioritized uplink grant is not transmitted.

Embodiment 3: if a MAC PDU is obtained for a de-prioritized uplink grant, then a timer configuredGrantTimer of a HARQ process (namely a HARQ process identified by this uplink grant) corresponding to this uplink grant is not started.

Figure 3:
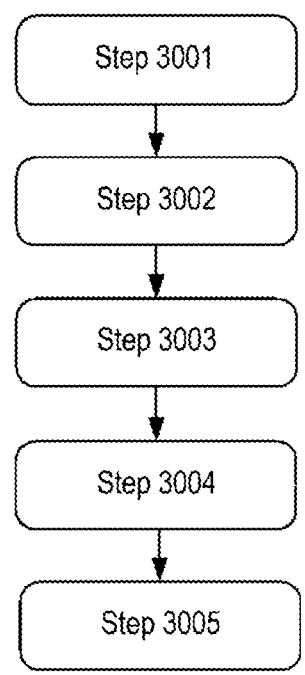
FIG. 3 shows a schematic flowchart of a method according to Embodiment 3 of the present disclosure.

The specific description is as follows:

FIG. 3 shows a schematic flowchart of the method according to Embodiment 3.

For each uplink grant, a HARQ entity identifies a HARQ process associated with this uplink grant, and performs the following steps for each identified HARQ process:

In step 3001, if one of the following conditions 3a-3e is met, then step 3002 is performed:

Condition 3a: the received uplink grant was not addressed to a Temporary C-RNTI on the PDCCH, and the NDI provided in the associated HARQ information has been toggled compared to the value in the previous transmission of the transport block (or MAC PDU) of this HARQ process.

Condition 3b: if this uplink grant was received on the PDCCH for the C-RNTI, and the HARQ buffer of the identified HARQ process is empty.

Condition 3c: if this uplink grant was received in a Random Access Response.

Condition 3d: if this uplink grant was received on the PDCCH in ra-ResponseWindow for the C-RNTI, and this PDCCH successfully completed the Random Access procedure initiated for beam failure recovery.

Condition 3e: if this uplink grant is part of a bundle of configured uplink grants and may be for initial transmission defined in clause 6.1.2.3 of TS 38.214, and if no MAC PDU has been obtained for this bundle of configured uplink grants.

In step 3002, if condition 3f or 3g is met, then the following operations 3A and 3B are performed, otherwise, step 3003 is performed:

Condition 3f: if there is a MAC PDU in the Msg3 buffer and the uplink grant was received in a Random Access Response.

Condition 3g: if there is a MAC PDU in the Msg3 buffer, and the uplink grant was received on the PDCCH in ra-ResponseWindow and addressed to the C-RNTI, and this PDCCH successfully completed the Random Access procedure initiated for beam failure recovery.

Operation 3A, obtain a MAC PDU from the message 3 (Msg3) buffer, and use the same to perform transmission.

Operation 3B, if the uplink grant size does not match a size of the obtained MAC PDU, and if the Random Access procedure was successfully completed upon receiving this uplink grant, then indicate to the Multiplexing and assembly entity to include MAC subPDU(s) carrying a MAC SDU from the obtained MAC PDU in the subsequent uplink transmission.

In step 3003, if one of conditions 3h-3j is met, then it is considered that a MAC PDU has been obtained, otherwise, step 3004 is performed:

Condition 3h: if the MAC entity is configured with autonomousReTx, if this uplink grant is a prioritized configured uplink grant, if a previous configured uplink grant of this HARQ process is a de-prioritized uplink grant, if a MAC PDU has already been obtained for this HARQ process, and if a transmission of the MAC PDU has not been performed.

Condition 3i: if the MAC entity is configured with autonomousReTx, if this uplink grant is a prioritized configured uplink grant, if a previous configured uplink grant of this HARQ process is a de-prioritized uplink grant, if a MAC PDU has been obtained for this HARQ process, and if an indication that a transport block (or a MAC PDU) corresponding to this HARQ process has been discarded is received.

Condition 3j: if the MAC entity is configured with autonomousReTx, if this uplink grant is a prioritized configured uplink grant, if a previous configured uplink grant of this HARQ process is de-prioritized uplink grant, if a MAC PDU has been obtained for this HARQ process, and if the MAC PDU has not been transmitted or an indication that a transport block (or a MAC PDU) corresponding to this HARQ process has been discarded is received.

In step 3004, if the uplink grant is a configured uplink grant, and if configuredGrantTimer corresponding to the HARQ process is running, then this uplink grant is skipped, otherwise, step 3005 is performed.

Alternatively, in step 3004, if the uplink grant is a configured uplink grant, if configuredGrantTimer corresponding to the HARQ process is running, and if a previous uplink grant of this HARQ process is not addressed to the C-RNTI, then this uplink grant is skipped, otherwise, step 3005 is performed.

In step 3005, if the MAC entity is not configured with lch-basedPrioritization, or if this uplink grant is a prioritized uplink grant, then a MAC PDU to perform transmission is obtained from the Multiplexing and assembly entity.

For detailed description of MAC PDU generation performed by the multiplexing and assembly entity described in the present disclosure, please see TS 38.321. This entity performs MAC PDU generation according to a logical channel priority rule, a MAC control element, and the like.

The following describes operations performed by the HARQ entity after a MAC PDU has been obtained for the uplink grant.

If a MAC PDU is obtained for transmission, then the following operations are performed:

deliver this MAC PDU, a corresponding uplink grant, and HARQ information of this transport block to the identified HARQ process (a HARQ process identified by the corresponding uplink grant); and if this uplink grant is not a configured uplink grant, or if the uplink grant is not addressed to the CS-RNTI, or if the uplink grant is a prioritized configured uplink grant, or if the uplink grant is a prioritized uplink grant addressed to the CS-RNTI, then perform the following operations 3C and 3D:

Operation 3C, instruct the identified HARQ process to trigger a new transmission.

Operation 3D, if the uplink grant is addressed to the CS-RNTI, or if the uplink grant is a configured uplink grant, or if the uplink grant is addressed to the C-RNTI and the identified HARQ process is configured by the configured uplink grant, then when the transmission is performed, start or restart configuredGrantTimer corresponding to the HARQ process.

In the embodiments of the present disclosure, the being addressed to the C-RNTI, the CS-RNTI, or the TC-RNTI refers to an uplink grant addressed to the C-RNTI or the CS-RNTI or the TC-RNTI of the MAC entity, or an uplink grant addressed to the C-RNTI or the CS-RNTI or the TC-RNTI of the MAC entity received on the PDCCH, or an uplink grant indicated by a PDCCH scrambled by the C-RNTI or the CS-RNTI or the TC-RNTI.

For the MAC entity configured with lch-basedPrioritization, a priority of an uplink grant is determined by the highest priority among priorities of the logical channels with data that can be multiplexed or is multiplexed in the MAC PDU according to a logical channel priority (LCP) procedure (please see 5.4.3.1.2 of TS 38.321 for details, and the latest version is R2-1916352). For example, an uplink grant CG1 is received, and this uplink grant can transmit data from logical channels LCH1, LCH2, and LCH3. A priority of LCH1 is 1 and is the highest, a priority of LCH2 is 2, and a priority of LCH3 is 3 (assuming that a higher number corresponds to a lower priority). Assuming that only LCH2 and LCH3 have data to transmit in this case, then the priority of CG1 is 2. If the priority of the uplink grant further takes a priority of the MAC control element into account, then the priority of the uplink grant is determined according to the priority of the MAC control element and the priority of the logical channel having data that can be transmitted.

Unless otherwise specified, the uplink grant described in the embodiments of the present disclosure may be a DG or a CG.

Figure 4:
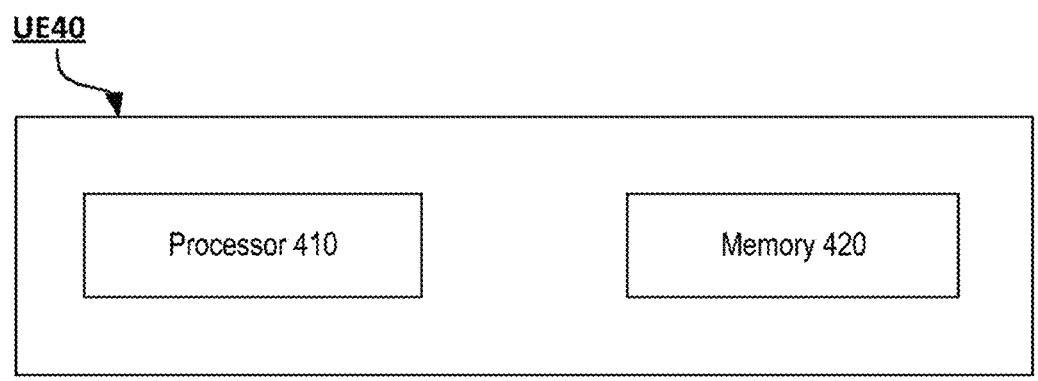
FIG. 4 shows a block diagram of user equipment according to an embodiment of the present disclosure.

FIG. 4 shows a block diagram of user equipment (UE) 40 according to an embodiment of the present disclosure. As shown in FIG. 4, the UE 40 includes a processor 410 and a memory 420. The processor 410 may include, for example, a microprocessor, a microcontroller, an embedded processor, and the like. The memory 420 may, for example, include a volatile memory (for example, a Random Access Memory (RAM)), a Hard Disk Drive (HDD), a non-volatile memory (for example, a flash memory), or other memories. Program instructions are stored on the memory 420. The instructions, when run by the processor 410, can perform the aforementioned method in the user equipment described in detail in the present disclosure.

Computer-executable instructions or a program running on the device according to the present disclosure may be a program causing a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The computer-executable instructions or program for implementing the functions of the embodiments of the present disclosure may be recorded on a computer-readable storage medium. The corresponding functions can be implemented by causing a computer system to read programs recorded on the recording medium and execute the same. The so-called "computer system" herein may be a computer system embedded in the device, which may include operating systems or hardware (for example, peripherals). The "computer-readable storage medium" may be a semiconductor recording medium, an optical recording medium, a magnetic recording medium, a recording medium for transiently dynamically storing a program, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, discrete hardware components, or any combination of the above devices. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices mounted indoors or outdoors, such as AV equipment, kitchen equipment, cleaning equipment, air conditioners, office equipment, vending machines, and other household appliances, may be used as terminal devices or communication devices.

The embodiments of the present disclosure have been described in detail above with reference to the accompanying drawings. However, the specific structures are not limited to the above-mentioned embodiments. The present disclosure also includes any design modifications that do not depart from the main idea of the present disclosure. In addition, various modifications can be made to the present disclosure within the scope of the claims. Embodiments obtained by appropriately combining the technical means disclosed in different embodiments are also included within the technical scope of the present disclosure. In addition, components with the same effect described in the embodiments above may be replaced with one another.

The invention claimed is:

1. A method performed by a user equipment (UE), the method comprising:
   receiving a Radio Resource Control (RRC) message;
   considering an uplink grant addressed to a cell radio network temporary identifier (C-RNTI) or a configured scheduling radio network temporary identifier (CS-RNTI), which is one of uplink grants respective PUSCH durations of which overlap with each other, as a prioritized uplink grant and other overlapping uplink grant(s) as a de-prioritized uplink grant(s), in a case that (i) there is no overlapping PUSCH duration of a configured uplink grant a priority of which is higher than a priority of the uplink grant addressed to the C-RNTI or the CS-RNTI, and (ii) there is no overlapping PUCCH resource with a scheduling request (SR) transmission where a priority of a logical channel that has triggered the SR transmission is higher than the priority of the uplink grant addressed to the C-RNTI or the CS-RNTI;
   in a series of operations, considering a configured uplink grant, which is one of uplink grants respective PUSCH durations of which overlap with each other, as a prioritized uplink grant and other overlapping uplink grant(s) as a de-prioritized uplink grant(s), the series of the operations being performed in a case that (a) there is no overlapping PUSCH duration of another configured uplink grant a priority of which is higher than a priority of the configured uplink grant, (b) there is no overlapping PUSCH duration of an uplink grant addressed to C-RNTI or CS-RNTI a priority of which is higher than or equal to the priority of the configured uplink grant, and (c) there is no overlapping PUCCH resource with an SR transmission where a priority of a logical channel that has triggered the SR transmission is higher than the priority of the configured uplink grant; and performing actions based on a determination that the RRC message includes a specific parameter for a Medium Access Control (MAC) entity, wherein the actions include:
- in the series of the operations, stopping a configuredGrantTimer for a corresponding hybrid automatic repeat request (HARQ) process of a configured uplink grant based on a determination that the configured uplink grant is one of the de-prioritized uplink grant(s); and
- transmitting, with use of the configured uplink grant considered as the prioritized uplink grant, a MAC protocol data unit (PDU) that has already been obtained for a HARQ process but has not been transmitted completely, after a previous configuration uplink grant associated with the HARQ process is deprioritized.

2. A user equipment, comprising:

a processor; and a memory storing instructions, wherein, based on the instructions, the processor is configured to:

receive a Radio Resource Control (RRC) message;

consider an uplink grant addressed to a cell radio network temporary identifier (C-RNTI) or a configured scheduling radio network temporary identifier (CS-RNTI), which is one of uplink grants whose-respective PUSCH durations of which overlap with each other, as a prioritized uplink grant and other overlapping uplink grant(s) as a de-prioritized uplink grant(s), in a case that (i) there is no overlapping PUSCH duration of a configured uplink grant a priority of which is higher than a priority of the uplink grant addressed to the C-RNTI or the CS-RNTI, and (ii) there is no overlapping PUCCH resource with a scheduling request (SR) transmission where a priority of a logical channel that has triggered the SR transmission is higher than the priority of the uplink grant addressed to the C-RNTI or the CS-RNTI;

in a series of operations, consider a configured uplink grant, which is one of uplink grants respective PUSCH durations of which overlap with each other, as a prioritized uplink grant and other overlapping uplink grant(s) as a de-prioritized uplink grant(s), the series of the operations being performed in a case that (a) there is no overlapping PUSCH duration of another configured uplink grant a priority of which is higher than a priority of the configured uplink grant, (b) there is no overlapping PUSCH duration of an uplink grant addressed to C-RNTI or CS-RNTI a priority of which is higher than or equal to the priority of the configured uplink grant, and (c) there is no overlapping PUCCH resource with an SR transmission where a priority of a logical channel that has triggered the SR transmission is higher than the priority of the configured uplink grant; and perform actions based on a determination that the RRC message includes a specific parameter for a Medium Access Control (MAC) entity, wherein the actions include:
- in the series of the operations, stopping a configuredGrantTimer for a corresponding hybrid automatic repeat request (HARQ) process of a configured uplink grant based on a determination that the configured uplink grant is one of the de-prioritized uplink grant(s); and
- transmitting, with use of the configured uplink grant considered as the prioritized uplink grant, a MAC protocol data unit (PDU) that has already been obtained for a HARQ process but has not been transmitted completely, after a previous configuration uplink grant associated with the HARQ process is deprioritized.

* * * * *